US010423611B2

(12) United States Patent
Pringuey et al.

(10) Patent No.: US 10,423,611 B2
(45) Date of Patent: Sep. 24, 2019

(54) ADVANCED SEARCHING OF RELATIONAL DATA VIA A MOBILE DEVICE

(71) Applicant: salesforce.com, inc., San Francisco, CA (US)

(72) Inventors: Jean-Baptiste Pringuey, San Mateo, CA (US); Nathanael Black, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 947 days.

(21) Appl. No.: 14/694,255

(22) Filed: Apr. 23, 2015

(65) Prior Publication Data
US 2016/0034526 A1 Feb. 4, 2016

Related U.S. Application Data

(60) Provisional application No. 62/031,047, filed on Jul. 30, 2014.

(51) Int. Cl.
*G06F 16/00* (2019.01)
*G06F 16/242* (2019.01)

(52) U.S. Cl.
CPC ................ *G06F 16/2425* (2019.01)

(58) Field of Classification Search
CPC .................................. G06F 16/2425
See application file for complete search history.

(56) References Cited

U.S. PATENT DOCUMENTS

| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |

(Continued)

OTHER PUBLICATIONS

U.S. Appl. No. 13/998,890.
U.S. Appl. No. 13/986,251.

*Primary Examiner* — Paul Kim
(74) *Attorney, Agent, or Firm* — Dergosits & Noah LLP; Todd A. Noah

(57) ABSTRACT

A system, method and apparatus for providing for searching of relational data via a mobile communications device are provided. Information identifying searchable tables containing fields is received using a metadata application program interface (API). The metadata API provides information about a schema of the fields and a relationship of at least one of the fields to its corresponding object. Information for generating a view of relational data is provided to the mobile communications device. The view is based on at least one of the fields of at least one of the searchable tables, and the relationship between the at least one of the fields and its corresponding object. A set of user inputs is received based on the relationship presented in the view. A query definition corresponding to the set of user inputs for searching the relational data in accordance with the set of user inputs is created and stored.

20 Claims, 8 Drawing Sheets

(56) References Cited

U.S. PATENT DOCUMENTS

| | | |
|---|---|---|
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0181543 A1* | 9/2004 | Wu ............... G06F 17/30572 |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Rueben et al. |
| 2009/0177744 A1 | 7/2009 | Marlow et al. |
| 2012/0233137 A1 | 9/2012 | Jakobson et al. |
| 2013/0007069 A1* | 1/2013 | Chaliparambil ....... G06Q 10/10 707/803 |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |

\* cited by examiner

400

410

Manage views

420

1 - My important contracts

00000100

430

2 - My accounts

Prado San Francisco

GenePoint - Mountain View

United Oil & Gas, UK

United Oil & Gas.

500

510

Create a new view

1 - My important contracts —— 540

520

Edit

530

Delete

2 - My accounts —— 550

Edit

Delete

3 - my cases

600

Main object to query
Contract

Field used for label
Contract Number

Secondary Field used for label
--None--

645 Filter criteria 1
You selected a relationship new attributes are available:
CreatedBy.
650 Attribute used to filter
Alias
655
660 Operator used to filter
Equals
665
670 Value used to filter
jprin
675

Attribute used to filter
Account Type

Operator used to filter
Equals

Value used to filter
Prospect

680  Filter criteria 2

< >   Done — 690

685

US 10,423,611 B2

ADVANCED SEARCHING OF RELATIONAL DATA VIA A MOBILE DEVICE

CLAIM OF PRIORITY

This application claims the benefit of U.S. Provisional Patent Application No. 62/031,047, filed Jul. 30, 2014, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to computer systems and software, and, more particularly, to systems and methods for performing advanced searches of relational data via a mobile communications device.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

In conventional mobile communications devices, searching information stored remove from the mobile communications devices may be a challenging task. A user of such a device is typically required to retrieve data from, and sometime stores data on, the system using a mobile communications device. A user system may remotely access one of a plurality of server systems via the mobile communications device, and the server systems may in turn access the database system. Data retrieval from the system might include the issuance of a query from the mobile communications device to the database system via the server system. Often times, searches require a user to provide multiple clicks on a mobile communications devices in order to produce a proper query to get a desired result. Such requirements may not only be time consuming, but may also lead to increased errors in manual entry. Sometimes, searches of relational data are not possible via mobile communications devices at all, since the mobile communications devices may not have the information necessary to properly construct a search query for searching a remote database. As such, a salesperson may not be able to access information most important to the salesperson on a mobile communications device in an efficient and effective manner.

The growing popularity of cloud computing has led to the development of software platforms for businesses and other enterprises that provide more advanced cloud-based products and services, in addition to simple data storage and management requirements. Salesforce.com inc., of San Francisco, Calif., offers a variety of products and services that are cloud-based solutions upon which relevant applications can be launched and/or built for any business or enterprise, and can be integrated with the data storage and management services of a multi-tenant database system.

For example, the Salesforce1™ platform is used for the development and deployment of mobile enterprise applications. The Salesforce1™ platform is built on a core integrated development environment ("IDE") called Force.com™, which is a set of tools and services for creating and launching employee-facing applications that are both mobile and social. The Force.com platform includes a number of standard applications, which may be extended by customization, or custom applications may be created. The Force.com platform also includes access to a store for applications called the AppExchange, which is similar to the iTunes™ App Store, but for business applications.

A feature of the Salesforce1™ is the ability for users to have real-time access to a variety of relational data (e.g., enterprise resource planning data, customer relationship management data, etc.), organized into logical objects. However, while users have access to a vast amount of relational data, it would be desirable to have a real-time tool for users to perform advanced searches on the data. Accordingly, it is desirable to provide a tool that allows users to define their own custom views using filters from their mobile communications devices.

Any of the embodiments described herein may be used alone or together with one another in any combination. The one or more implementations encompassed within this specification may also include embodiments that are only partially mentioned or alluded to or are not mentioned or alluded to at all in this background or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Figure 1:
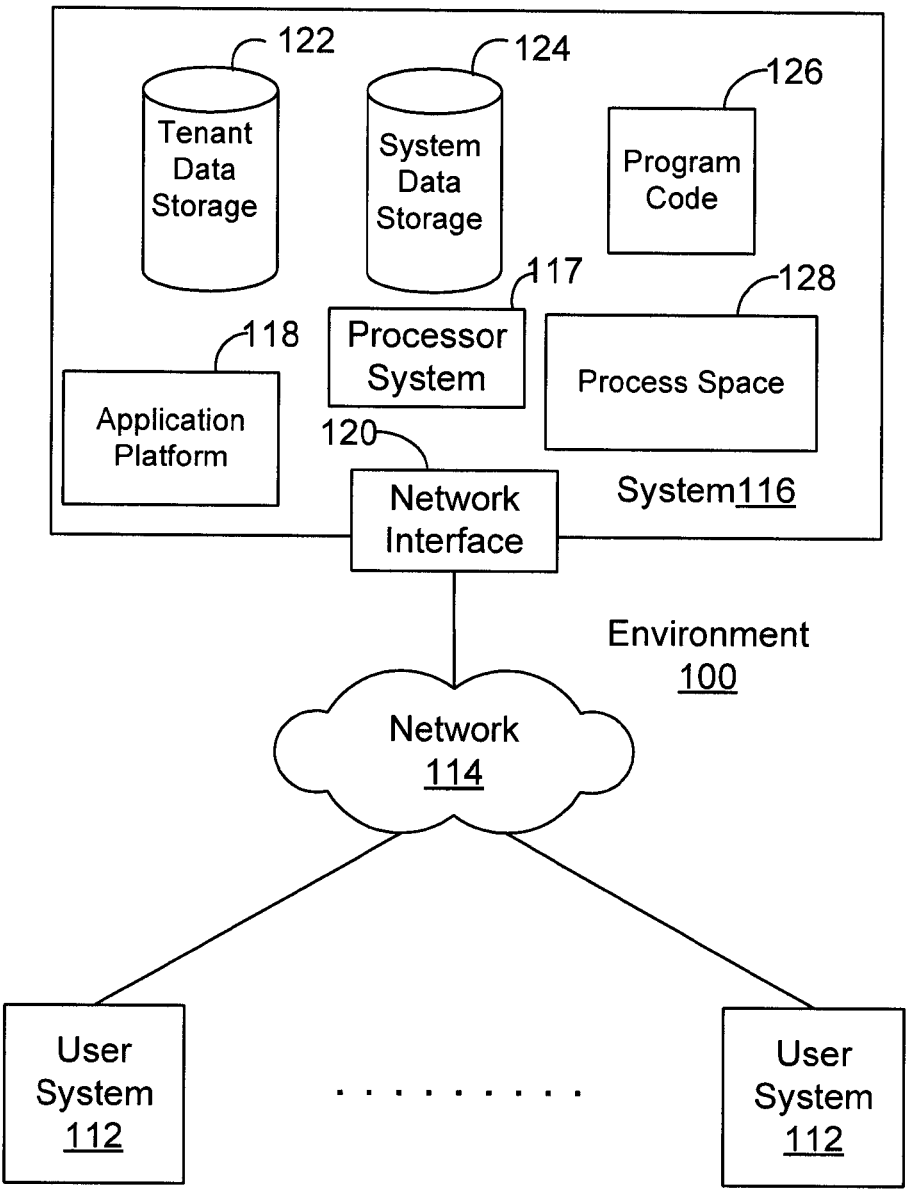
FIG. 1 shows a block diagram of an example of an environment in which an on-demand database service can be used in accordance with some implementations.

Systems and methods are provided for performing advanced searches of relational data via a mobile communications device. Examples of systems, apparatus, and methods according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations, also referred to herein as "blocks" or "steps," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Various implementations described or referenced herein are directed to different methods, apparatus, systems, and computer program products for performing advanced searches of relational data via a mobile communications device. Searches may be provided on data on the Internet or intranet of a company, and may include a variety of categories of numerical and textual data. In some implementations, the disclosed methods, apparatus, systems, and computer program products may be configured or designed for use in a multi-tenant database environment.

These and other implementations described and reference herein may be embodied in various types of hardware, software, firmware, of combinations of these. For example, some techniques disclosed herein may be implemented, at least in part, by machine-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of machine-readable media include, but are not limited to, magnetic media such as hard disks, floppy disks, and magnetic tape; optical media such as CD-ROM disks; magneto-optical media; and hardware devices that are specially configured to store program instructions, such as read-only memory devices ("ROM") and random access memory ("RAM") devices. These and other features of the disclosed implementations will be described in more detail below with reference to the associated drawings.

The terms "client device," "user system", and "client side user system" are used interchangeably herein and generally refer to handheld computing devices, mobile phones, laptop computers, work stations, and/or any variety of computing devices that includes a network connection. The term client device may refer to a computing device that is operated by an end user at a location remote from a server to which the client device is communicatively coupled.

The term "multi-tenant database system" can refer to those systems in which various elements of hardware and software of a database system may be shared by one or more customers. For example, a given application server may simultaneously process requests for a great number of customers, and a given database table may store rows for a potentially much greater number of customers. The term "query plan" generally refers to one or more operations used to access information in a database system.

A "user profile" or "user's profile" is generally configured to store and maintain data about the user of the database system. The data can include general information, such as title, phone number, a photo, a biographical summary, and a status (e.g., text describing what the user is currently doing). the data can include messages created by other users. Where there are multiple tenants, a user is typically associated with a particular tenant. For example, a user could be a salesperson of a company, which is a tenant of the database system that provides a database service.

The term "record" generally refers to a data entity, such as an instance of a data object created by a user of the database service, for example, about a particular (actual or potential) business relationship or project. The data object can have a data structure defined by the database service (a standard object) or defined by a subscriber (custom object). For example, a record can be for a business partner or potential business partner (e.g., a client, vendor, distributor, etc.) of the user, and can include an entire company, subsidiaries, or contacts at the company. As another example, a record can be a project that the user is working on, such as an opportunity (e.g., a possible sale) with an existing partner, or a project that the user is trying to get. In one implementation of a multi-tenant database, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

FIG. 1 shows a block diagram of an example of an environment 100 in which an on-demand database service can be used in accordance with some implementations. Environment 100 may include user systems 112, network 114, database system 116, processor system 117, application platform 118, network interface 120, tenant data storage 122, system data storage 124, program code 126, and process space 128. In other implementations, environment 100 may not have all of these components and/or may have other components instead of, or in addition to, those listed above.

Environment 100 is an environment in which an on-demand database service exists. User system 112 may be any machine or system that is used by a user to access a database system 116. For example, any of user systems 112 can be a handheld computing device, a mobile phone, a laptop computer, a work station, and/or a network of such computing devices. As illustrated in FIG. 1 user systems 112 might interact via a network 114 with an on-demand database service, which is implemented in the example of FIG. 1 as database system 116.

An on-demand database service, such as system 116, is a database system that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 118 may be a framework that allows the applications of system 116 to run, such as the hardware and/or software, e.g., the operating system. In some implementations, application platform 118 enables creation, managing and executing one or more applications developed by the provider of the on-demand database service, users accessing the on-demand database service via user systems 112, or third party application developers accessing the on-demand database service via user systems 112.

The users of user systems 112 may differ in their respective capacities, and the capacity of a particular user system 112 might be entirely determined by permissions (permission levels) for the current user. For example, where a user is using a particular user system 112 to interact with system 116, that user system has the capacities allotted to that user. However, while an administrator is using that user system to interact with system 116, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 114 is any network or combination of networks of devices that communicate with one another. For example, network 114 can be any one or any combination of a LAN (local area network), WAN (wide area network), telephone network, wireless network, point-to-point network, star network, token ring network, hub network, or other appropriate configuration. Network 114 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 112 might communicate with system 116 using TCP/IP and, at a higher network level, use other common Internet protocols to communicate, such as HTTP, FTP, AFS, WAP, etc. In an example where HTTP is used, user system 112 might include an HTTP client commonly referred to as a "browser" for sending and receiving HTTP signals to and from an HTTP server at system 116. Such an HTTP server might be implemented as the sole network interface 120 between system 116 and network 114, but other techniques might be used as well or instead. In some implementations, the network interface 120 between system 116 and network 114 includes load sharing functionality, such as round-robin HTTP request distributors to balance loads and distribute incoming HTTP requests evenly over a plurality of servers. At least for users accessing system 116, each of the plurality of servers has access to the MTS' data; however, other alternative configurations may be used instead.

In one implementation, system 116, shown in FIG. 1, implements an application on a mobile communications device that allows users to perform advanced searches of relational data. For example, in one implementation, system 116 includes application servers configured to implement and execute an advanced search, as well as provide related data, code, forms, web pages and other information to and from user systems 112 and to store to, and retrieve from, a database system related data, objects, and Webpage content. With a multi-tenant system, data for multiple tenants may be stored in the same physical database object in tenant data storage 122, however, tenant data typically is arranged in the storage medium(s) of tenant data storage 122 so that data of one tenant is kept logically separate from that of other tenants so that one tenant does not have access to another tenant's data, unless such data is expressly shared. In certain implementations, system 116 implements applications other than, or in addition to, the advanced search application. For example, system 116 may provide tenant access to multiple hosted (standard and custom) applications, including a social networking application. User (or third party developer) applications, which may or may not include social networking applications, may be supported by the application platform 118, which manages creation, storage of the applications into one or more database objects and executing of the applications in a virtual machine in the process space of the system 116.

One arrangement for elements of system 116 is shown in FIG. 1, including a network interface 120, application platform 118, tenant data storage 122 for tenant data 223, system data storage 124 for system data accessible to system 116 and possibly multiple tenants, program code 126 for implementing various functions of system 116, and a process space 128 for executing MTS system processes and tenant-specific processes, such as running applications as part of an application hosting service. Additional processes that may execute on system 116 include database indexing processes.

Several elements in the system shown in FIG. 1 include conventional, well-known elements that are explained only briefly here. For example, each user system 112 could include a desktop personal computer, workstation, laptop, PDA, cell phone, or any wireless access protocol (WAP) enabled device or any other computing device capable of interfacing directly or indirectly to the Internet or other network connection. User system 112 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 112 to access, process and view information, pages and applications available to it from system 116 over network 114. Each user system 112 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 116 or other systems or servers. For example, the user interface device can be used to access data and applications hosted by system 116, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 112 and all of its components are operator configurable using applications, such as a browser, including computer code run using a central processing unit such as an Intel Pentium® processor or the like. Similarly, system 116 (and additional instances of an MTS, where more than one is present) and all of its components might be operator configurable using application(s) including computer code to run using processor system 117, which may be implemented to include a central processing unit, which may include an Intel Pentium® processor or the like, and/or multiple processor units.

A computer program product implementation includes a non-transitory machine-readable storage medium (media) having instructions stored thereon/in, which can be used to program a computer to perform any of the processes/methods of the implementations described herein. Computer program code 126 for operating and configuring system 116 to intercommunicate and to process web pages, applications and other data and media content as described herein is preferably downloadable and stored on a hard disk. The entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data.

Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 116 is configured to provide web pages, forms, applications, data and media content to user (client) systems 112 to support the access by user systems 112 as tenants of system 116. As such, system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations.

Additionally, the term "server" is meant to refer to a computing device or system, including processing hardware and process space(s), an associated storage system such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 2:
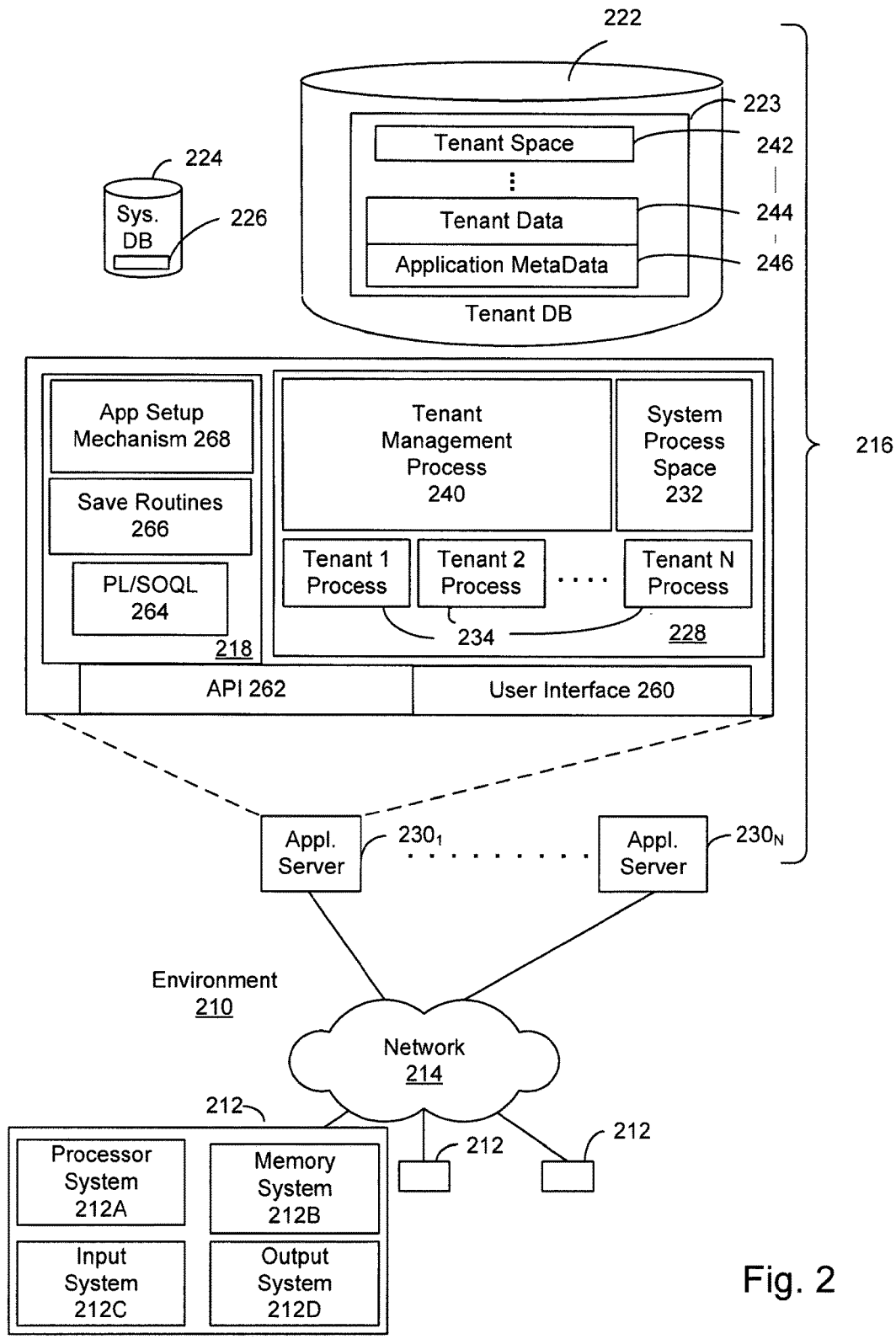
FIG. 2 illustrates a block diagram of an embodiment of elements of FIG. 1 and various possible interconnections between these elements.

FIG. 2 illustrates environment 210. However, in FIG. 2 elements of system 216 and various interconnections in an embodiment are further illustrated. FIG. 2 shows that user system 212 may include processor system 212A, memory system 212B, input system 212C, and output system 212D. FIG. 2 shows network 214 and system 216. FIG. 2 also shows that system 216 may include tenant data storage 222, tenant data 223, system data storage 224, system data 226, User Interface (UI) 260, Application Program Interface (API) 262, PL/SOQL 264, save routines 266, application setup mechanism 268, applications servers $230_1$-$230_N$, system process space 232, tenant process spaces 234, tenant management process 240, tenant storage area 242, user storage 244, and application metadata 246. In other embodiments, environment 210 may not have the same elements as those listed above and/or may have other elements instead of, or in addition to, those listed above.

User system 112, network 114, system 116, tenant data storage 122, and system data storage 124 were discussed above in FIG. 1. Regarding user system 212, processor system 212A may be any combination of one or more processors. Memory system 212B may be any combination of one or more memory devices, short term, and/or long term memory. Input system 212C may be any combination of input devices, such as one or more keyboards, mice, trackballs, scanners, cameras, touch screens, and/or interfaces to networks. Output system 212D may be any combination of output devices, such as one or more monitors, printers, and/or interfaces to networks.

As shown by FIG. 2, system 216 may include a network interface 120 (of FIG. 1) implemented as a set of HTTP application servers 230, an application platform 218, process space 228 for executing MTS system processes and tenant-specific processes, tenant data storage 222, and system data storage 224. Also shown is system process space 232, including individual tenant process spaces 234 and a tenant management process 240. Each application server 230 may be configured to tenant data storage 222 and the tenant data 223 therein, and system data storage 224 and the system data 226 therein to serve requests of user systems 212. The tenant data 223 might be divided into individual tenant storage areas 242, which can be either a physical arrangement and/or a logical arrangement of data. Within each tenant storage area 242, user storage 244 and application metadata 246 might be similarly allocated for each user. For example, a copy of a user's most recently used (MRU) items might be stored to user storage 244. Similarly, a copy of MRU items for an entire organization that is a tenant might be stored to tenant storage area 242. A UI 260 provides a user interface and an API 262 provides an application programmer interface to system 216 resident processes to users and/or developers at user systems 212. The tenant data and the system data may be stored in various databases, such as one or more Oracle® databases.

Application platform 218 includes an application setup mechanism 268 that supports application developers' creation and management of applications, which may be saved as metadata into tenant data storage 222 by save routines 266 for execution by subscribers as one or more tenant process spaces 234 managed by tenant management process 240 for example. Invocations to such applications may be coded using PL/SOQL 34 that provides a programming language style interface extension to API 262. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manage retrieving application metadata 246 for the subscriber making the invocation and executing the metadata as an application in a virtual machine.

Each application server 230 may be communicably coupled to database systems, e.g., having access to system data 226 and tenant data 223, via a different network connection. For example, one application server $230_1$ might be coupled via the network 214 (e.g., the Internet), another application server $230_{N-1}$ might be coupled via a direct network link, and another application server $230_N$ might be coupled by yet a different network connection. Transfer Control Protocol and Internet Protocol (TCP/IP) are typical protocols for communicating between application servers 230 and the database system. However, it will be apparent to one skilled in the art that other transport protocols may be used to optimize the system depending on the network interconnect used.

In certain embodiments, each application server 230 is configured to handle requests for any user associated with any organization that is a tenant. Because it is desirable to be able to add and remove application servers from the server pool at any time for any reason, there is preferably no server affinity for a user and/or organization to a specific application server 230. In one embodiment, therefore, an interface system implementing a load balancing function (e.g., an F5 Big-IP load balancer) is communicably coupled between the application servers 230 and the user systems 212 to distribute requests to the application servers 230. In one embodiment, the load balancer uses a least connections algorithm to route user requests to the application servers 230. Other examples of load balancing algorithms, such as round robin and observed response time, also can be used. For example, in certain embodiments, three consecutive requests from the same user could hit three different application servers 230, and three requests from different users could hit the same application server 230. In this manner, system 216 is multi-tenant, wherein system 216 handles storage of, and access to, different objects, data and applications across disparate users and organizations.

As an example of storage, one tenant might be a data management company that provides an application where users can engage the application via system 216 to manage a profile and perform advanced search on certain data. Thus, a user might maintain contact data, messages, performance information, and digital media (such as pictures, videos, hyperlinks, etc.) corresponding to that user's profile (e.g., in tenant data storage 222). In an example of a MTS arrangement, since all of the data and the applications to access, view, modify, transmit, receive, etc., can be maintained and accessed by a user system having nothing more than network access, the user can manage his or her profiles and communications from any of many different user systems. For example, if a user is accessing the application using a mobile communications device that has Internet access, the user can obtain the same information updates as that user can obtain using any other type of devices, whether public or private, as long as the user logs into his or her own account.

While each user's data might be separate from other users' data regardless of the networks of each user, some data might be organization-wide data shared or accessible by a plurality of users or all of the users for a given organization that is a tenant. Thus, there might be some data structures managed by system 216 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 216 might also maintain system level data usable by multiple tenants or other data. Such system level data might include industry reports, news, postings, and the like that are sharable among tenants.

In certain embodiments, user systems 212 (which may be client systems) communicate with application servers 230 to request and update system-level and tenant-level data from system 216 that may require sending one or more queries to tenant data storage 222 and/or system data storage 224. System 216 (e.g., an application server 230 in system 216) automatically generates one or more SQL statements (e.g., one or more SQL queries) that are designed to access the desired information. System data storage 224 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a social networking application database may include a table that describes a user with fields for basic contact information such as name, location, email, etc. Another table might describe organizations with which the user is affiliated, including fields for information such as home town, school(s) attended, work, affinity groups, etc. In some multi-tenant database systems, standard entity tables might be provided for use by all tenants. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

In one aspect of the invention, an application provides end users the ability to access information that the user is most interested in quickly. The application permits a user to define ad hoc custom views against any objects and attributes available (e.g., contact information, account information, custom objects, etc.) with advanced search filters on a single page. The search is performed on a database system that stores relational data. The filters may be defined by the user from a mobile communications device. The application also allows the user to define multiple views with search filters from the mobile communications device. For example, with this application, a user can now define a highly configurable search for seeking out content that is of highest interest to the user in a single click. The user may also define several views on the same object and display them simultaneously.

Figure 3:
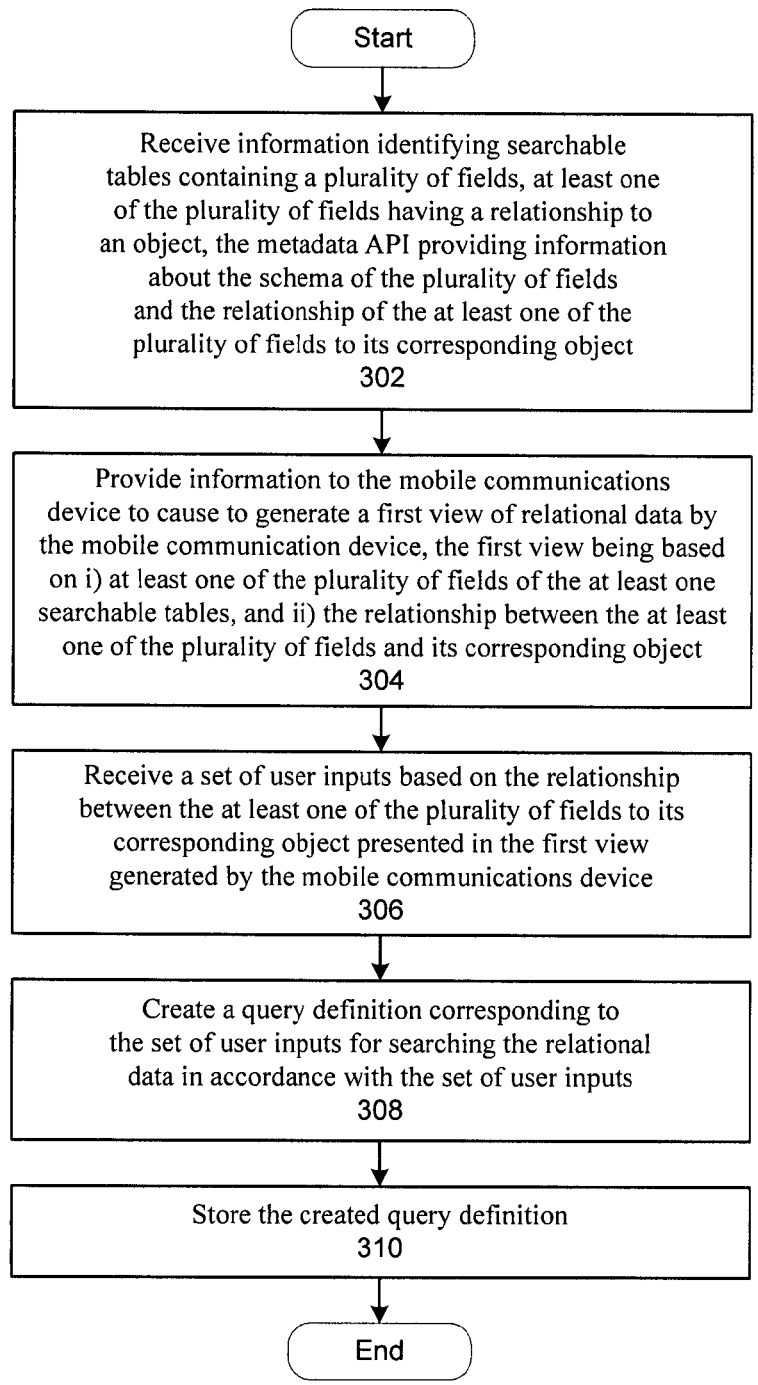
FIG. 3 depicts an operational flow diagram illustrating a high level overview of a technique for performing advanced searches of relational data via a mobile communications device.

FIG. 3 depicts an operational flow diagram illustrating a high level overview of a technique for performing advanced searches of relational data via a mobile communications device. One element that distinguishes this technique as an advanced version of search is shown in 302, where information identifying searchable tables that contain a plurality of fields, where at least one of the several fields have a relationship to an object, is received using a metadata API. The metadata API provides information about the schema of the several fields and the relationship of the at least one of the several fields to its corresponding object. In order to provide information about the schema, the objects/tables are traversed to dynamically find associated names and types (e.g., Boolean, number, date, pick list etc.). The associated names and types may be used to build the search criteria in a first view (described in further details below) that provides for searching with no programming intervention. In some embodiments, the information derived from the schema provide indications such as what other tables a user is using, what relationships exist between the objects and fields, and what type of data the objects represent.

In 304, information is provided to the mobile communications device to cause the mobile communications device to generate a first view of relational data. The first view is based on i) at least one of the several fields of at least one of the searchable tables, and ii) the relationship between the at least one of the several fields and its corresponding object. In some embodiments, the first view may include a combination of pick lists, from which a user can select, and text boxes, into which user may enter a string of characters. For example, the pick list may include an attribute (e.g., account name, account ID, etc.), or an operator (e.g., equals to, is less than, is greater than, etc.), and a text box may receive inputs of letters, numbers, symbols, or some combination thereof.

In 306, a set of user inputs is received based on the relationship between the at least one of the several fields to its corresponding object presented in the first view generated by the mobile communications device. The user inputs received may include, but are not limited to, a combination of selections from one or more pick lists and entry of a string of characters in one or more text boxes. The pick lists and text boxes that are provided in the first view are determined by the information provided by the metadata API. In other words, the information provided by the metadata API provides an indication of all the information that is available to be searched, and the relationship, if any, between the information available. The combination of selections of pick lists and entries into text boxes is used, in some instances, to apply an operator (selected from a pick list) to an attribute (also selected from a pick list) based on a value (entered into a text box). For example, the combination of selections and entries may be used to create a search for clients with contracts over a value of $5,000,000, where "contracts" and "over" are an attribute and an operator selected from two different pick lists, respectively, and where "$5,000,000" is a value entered into the text box.

Once the set of user inputs have been received, a query definition corresponding to the set of user inputs for searching the relational data in accordance with the set of user inputs is created in S308 and saved in S310. By creating and saving the query definition, the user may reuse the query definition at any time to perform the desired search on the database system. In some embodiments, the saved query definition may be associated with an icon that, when activated, performs the customized search. Thus, a user may perform the saved search with minimal inputs on the mobile communications device.

As an example, a salesperson who often travels from a home office in California to visit clients in New York may want to set up an advanced search in order to review the accounts of New York clients, particular those with contracts that will be expiring soon. The salesperson may open the application to launch a main page of the application. At launch, the searchable tables and corresponding fields in the database system may be identified, and the relationships between these fields and corresponding objects may be determined. As discussed above, the metadata API provides information about the schema of the several fields and the relationships.

Once determined, the salesperson may be presented with a first view that includes several categories from which the salesperson maybe select and/or modify. The first view may include a combination of pick lists and text boxes in some embodiments. The pick list may include several different attributes or operators, from which the user may select, and text boxes, into which letters, numbers, symbols, or some combination thereof may be input by the user. Furthering the example, the salesperson may select "contracts" as an attribute from an object pick list.

The application may also present to the salesperson a standard field for billing state/province as a filter from which the salesperson may select. This standard field may be presented based on determined relationships. The salesperson may set the relationship to "equals," and the state abbreviation "NY" for New York in this case. The salesperson may define additional metrics by selecting additional related fields. For example, the salesperson may make additional entries to customize the search for contract data in a customer relationship management system of an enterprise to be performed. That is, the salesperson may want to focus on contracts over $5,000,000, and thus may make pick list selections and text box entries indicating this desire. The salesperson may also select contract renewal date as another filter, and set the relationship to "less than," provide a parameter of "30 days." By taking the above steps, the salesperson is able to create query that retrieves information for New York clients with contracts over $5,000,000 that will expire within 30 days. Further details of the additional metrics are provided below with reference to FIGS. 6a-6c.

This query, which is defined by the salesperson, may be saved. Thus, the salesperson may be able to perform the saved search of relational data via a mobile phone by activating a single icon, and can quickly review the views based on the search results on a single page displayed by a mobile phone. In this example, the mobile phone displays a page that begins with a view of the New York clients whose contracts will expire within 30 days and includes a view of opportunities with a value that exceeds $5,000,000.

Figure 4:
FIG. 4 illustrates an example view of a main page of the application for performing advanced searches of relational data via a mobile communications device.
Figure 4:
Figure 4:
Figure 4:
Figure 4:
Figure 4:

FIG. 4 illustrates an example view of the main page of the application for performing advanced searches of relational data via a mobile communications device. Main page 400 may provide different views for a variety of different categories. In this example, two categories—first category 420 for "My important contracts" and second category 430 for "My accounts"—are shown in this view of main page 400. Although this view shows two categories, main page 400 may provide any number of categories that may be accessed as the user scrolls farther down main page 400.

Referring back to the example described in FIG. 3, first category 420, which is labeled as "My important contacts," may include all contracts that need to be renewed (e.g., contracts expiring in next month). This category may be established, for example, by the user defining queries to return all contracts that need to be renewed (e.g., contracts expiring in next month). Since the example user is traveling to New York, he may be interested in these expiring contracts. As indicated above, the user may further define a query to limit the search results to include only those contracts that are in New York. The user may also define additional queries to filter for certain events (e.g., demos) and high priority opportunities (e.g., opportunities that are not closed and that belong to high priority accounts with an amount greater than a predetermined value) relating to customers.

Figure 5:
FIG. 5 illustrates an example manage view page of the application for performing advanced searches of relational data.
Figure 5:
Figure 5:
Figure 5:

From main page 400, the user may select a manage views button 410 displayed on the main page of application on their mobile phone. FIG. 5 illustrates an example manage view page of the application for performing advanced searches of relational data. Manage view page 500 is presented to the user when managed views button is selected from main page 400. From manage view page 500, the user may create a new view by selecting "Create a new view" button 510. The user may also choose to edit a current view by selecting edit button 520, or choose to delete a current view by selecting delete button 530, for a corresponding category. In this case, the corresponding category to edit button 520 and delete button 530 is "My important contracts" 540. The same options may exist for additional categories, such as "My accounts" 550 as showing in this example.

Selecting delete button 530 will cause the corresponding category to be deleted. For example, if delete button 530 is selected by the user in this example, "My important contracts" 540 along with all associated queries will be deleted from the application for the user. When the user selects edit button 520 from manage view page 500, edit view pages may be provided by the application.

Figure 6A:
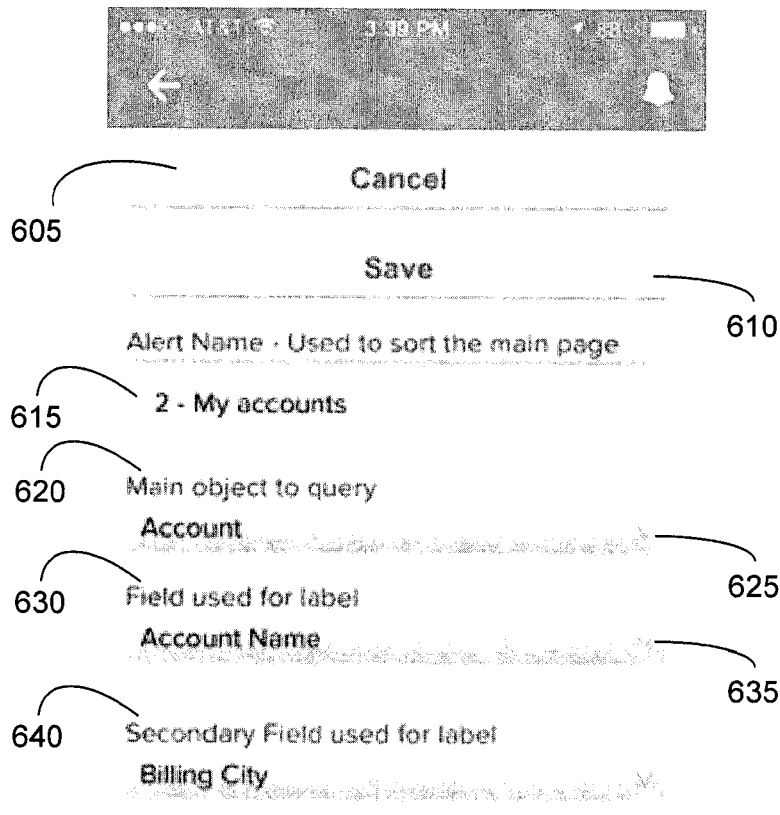
FIGS. 6a-6c illustrate an example edit view page of the application for editing advanced searches of relational data.
Figure 6B:
Figure 6C:
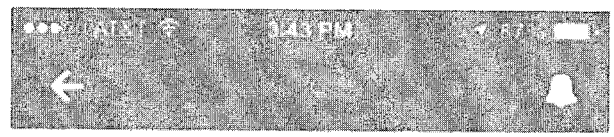
Figure 6C:

FIGS. 6a-6c illustrate an example edit view page of the application for editing advanced searches of relational data. While the description below relates to editing a category, the same concept may be applied to creating a new view as initiated by selecting "Create a new view" button 510. FIG. 6a shows a top portion of edit view page 600. In this portion, cancel button 605 is provided so that the user may cancel out of editing a category. Upon selecting the cancel button 605, any changes to the category will not be saved, and the user may be returned to manage view page 500. Similarly, selecting save button 610 may also cause the user to be returned manage view page 500; however, selecting save button 610 will cause changes to the category to be saved prior to the user being returned to manage view page 500.

On edit view page 600, the user may set alert name 615 to be associated with the category. In this example, alert name 615 is set as "2—My accounts." However, alert name 615 may be entered as any combination of alpha-numeric characters and symbols. This allows the user to customize how the user would like the name of category to be displayed. In some embodiments, there may be a limit to the number of characters permitted in alert name 615, as well as a limit to symbols that may be included. Alert name 615 may be used by main page 500 to sort the different categories.

Edit view page 600 may also include main object query 620 and field used for label 630, with corresponding pick lists 625 and 635. Main object query 620 is constructed based on a selection of parameters. In this example, main object query 620 provides pick list 625 for selecting an object that the user would like to filter against. Pick list 625 may include all objects available on a platform such as Salesforce1™. Field used for label 630 is the field that will be used to display each search result in the main page, and may be selected from pick list 635 to indicate which label the user would like to use for labeling the list. While this example provides field used for label 630 and secondary field used for label 640, one of ordinary skill in the art may appreciate that any number of fields may be used for labels.

FIG. 6b shows a second portion of edit view page 600. In this portion of edit view page 600, first filter criteria 645 is presented for display. The filter criteria provided allows the user to determine how the user would like data to be filtered. In this example, first filter criteria 645 provides attributes used to filter 650 as a pick list 655 from which the user may select. In this example, the user has chosen to "alias" as the attribute. While the example uses "alias" as the selected attributes, a variety of additional attributes may be provided.

First filter criteria 645 further provides operator used to filter 660 as a pick list 665 from which the user may select. Referring back to the example in FIG. 6b, the operator chosen for this case is "Equals." The "Equals" operator in this example will cause the filter to identify all aliases that are equal to a specified value. While the "Equals" operator has been chosen in this example, this choice is provided for exemplary purposes only. Any number of different operators such as "contains," "not contains," "greater than," "less than," "not equal," etc., may also be used. Additionally, the operators may be applied to alphabet and/or numeric characters, and sometimes symbols, as appropriate. For example, the operator "greater than" generally applies to a numeric value, where as "equals" may apply to alphabet and/or numeric characters.

First filter criteria 645 also provides value used to filter 670 as textbox 675 in which the user may enter text. The text in textbox 675 provides a value to which the selected operator may be applied. Referring back to the example in FIG. 6b, the operator "Equals" has been selected to apply to the text "jprin" for the attribute "alias." Thus, the filter criteria in this example will identify all aliases that have values equal to jprin. One of ordinary skill in the art would appreciate that the user is presented with a different filtering options by applying one of the variety of operators made available to the user to identify attribute based on a value input by the user.

FIG. 6c shows a bottom portion of edit view page 600. The bottom portion of edit view page 600 may include second filter criteria 680 and expanded view 685 of one of the pick list. Expanded view 685 is activated when a pick list is selected by the user. In the example, the pick list corresponding to second filter criteria 680 has been selected by the user. From expanded view 685, the user may select a desired item for a corresponding object. In this example, the user has scrolled expanded view 685 to a desired "Channel Partner/Reseller" item of the pick list. Upon selecting done button 690, the "Channel Partner/Reseller" item will be selected as the attribute for second filter criteria 680.

While the example shown in FIGS. 6a-6c depict first and second filter criteria, the user may add any number of additional filter criteria. Such additions may assist the user in narrowing down the data that is to be presented to the user as a result of the filter, thereby providing a set of data that's more easily processed by the user. The additional filter criteria may also be relationship based. If the user selects, for example, "contracts" as a main object, that "contracts" object may have attributes such as text (e.g., contract name), date (e.g., contract start date), pick list (e.g., contract status), number (e.g., contract value), or relationship (e.g., customer). When the user selects "customer" as the attribute, a list of available fields will reload for the "customer" attribute. The "customer" attribute may have a set of unique relationships that can also be selected for filtering purposes.

The examples described above should not be taken as limiting or preferred. These examples sufficiently illustrate the technology disclosed without being overly complicated, and are not intended to illustrate all embodiments of the technology disclosed. A person having ordinary skill in the art will appreciate that there are many potential applications for one or more implementations of this disclosure.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for providing for searching of relational data stored in an on-demand database system via a mobile communications device, the method comprising:
   receiving, by the database system, information including (i) information identifying searchable tables containing a plurality of fields, wherein at least one of the plurality of fields has a relationship to an object (ii) information about the schema of the plurality of fields, and (iii) information about the relationship of the at least one of the plurality of fields to its corresponding object using a metadata API;
   providing, by the database system, information to the mobile communications device to cause to generate a first view of relational data by the mobile communications device, the first view being based on i) at least one of the plurality of fields of at least one of the searchable tables, and ii) the relationship between the at least one of the plurality of fields and its corresponding object;
   receiving, by the database system, a set of user inputs based on the relationship between the at least one of the plurality of fields to its corresponding object presented in the first view generated by the mobile communications device;
   creating, by the database system, a query definition corresponding to the set of user inputs for searching the relational data in accordance with the set of user inputs; and
   storing, by the database system, the created query definition.

2. The method of claim 1, further comprising:
   applying, by the database system, the created query definition and metadata API to retrieve the corresponding relational data;
   providing, by the database system, information to the mobile communications device, in response to receiving a selection of the query definition data from the mobile communications device, to cause to generate a second view of the relational data by the mobile communications device based on the query definition.

3. The method of claim 2, wherein providing the information to the mobile communications device to cause to generate a second view of the relational data by the mobile communications device based on the query definition comprises providing information to the mobile communications device to cause to generate a second view of the relational data by the mobile communications device by filtering the relational data based on the received set of user inputs.

4. The method of claim 1, wherein the received set of user inputs comprises at least one of a selection an attribute, a selection of an operator, and an entry of a value.

5. The method of claim 4, wherein the selection of the attribute and the selection of the operator are received as a selection from a pick list.

6. The method of claim 5, wherein the entry of the value is received as an entry into a textbox.

7. The method of claim 6, wherein filtering the relational data based on the received selections comprises applying the selected operator to the selected attribute based on the entered value.

8. A computer program product comprising computer readable program code for searching of relational data stored in an on-demand database system via a mobile communications device, the program code to be executed by one or more processors when retrieved from a non-transitory machine-readable medium, the program code including instructions to:
   receive, by the database system, information including (i) information identifying searchable tables containing a plurality of fields, wherein at least one of the plurality of fields has a relationship to an object (ii) information about the schema of the plurality of fields, and (iii) information about the relationship of the at least one of the plurality of fields to its corresponding object using a metadata API;
   provide, by the database system, information to the mobile communications device to cause to generate a first view of relational data by the mobile communications device, the first view being based on i) at least one of the plurality of fields of at least one of the searchable tables, and ii) the relationship between the at least one of the plurality of fields and its corresponding object;
   receive, by the database system, a set of user inputs based on the relationship between the at least one of the plurality of fields to its corresponding object presented in the first view generated by the mobile communications device;

create, by the database system, a query definition corresponding to the set of user input for searching the relational data in accordance with the set of user inputs; and store, by the database system, the created query definition.

9. The computer program product of claim 8, further comprising program code including instructions to:

apply, by the database system, the created query definition and metadata API to retrieve the corresponding relational data;

provide, by the database system, information to the mobile communications device, in response to receiving a selection of the query definition data from the mobile communications device, to cause to generate a second view of the relational data by the mobile communications device based on the query definition.

10. The computer program product of claim 9, wherein the program code including instructions to provide information to the mobile communications device to cause to generate a second view of the relational data by the mobile communications device based on the query definition comprises program code including instructions to provide information to the mobile communications device to cause to generate a second view of the relational data by the mobile communications device by filtering the relational data based on the received set of user inputs.

11. The computer program product of claim 10, wherein the received set of user inputs comprises at least one of a selection an attribute, a selection of an operator, and an entry of a value.

12. The computer program product of claim 11, wherein the selection of the attribute and the selection of the operator are received as a selection from a pick list.

13. The computer program product of claim 12, wherein the entry of the value is received as an entry into a textbox.

14. The computer program product of claim 13, wherein the program code including instructions to filter the relational data based on the received selections comprises program code including instructions to apply the selected operator to the selected attribute based on the entered value.

15. A system for advanced searching of relational data in an on-demand database system via a mobile communications device, the system comprising:

one or more hardware processors; and a non-transitory computer readable medium storing a plurality of instructions, which when executed, cause the one or more processors to:

receive, by the database system, information including (i) information identifying searchable tables containing a plurality of fields, wherein at least one of the plurality of fields has a relationship to an object (ii) information about the schema of the plurality of fields, and (iii) information about the relationship of the at least one of the plurality of fields to its corresponding object using a metadata API;

provide, by the database system, information to the mobile communications device to cause to generate a first view of relational data by the mobile communications device, the first view being based on i) at least one of the plurality of fields of at least one of the searchable tables, and ii) the relationship between the at least one of the plurality of fields and its corresponding object;

receive, database system, a set of user inputs based on the relationship between the at least one of the plurality of fields to its corresponding object presented in the first view generated by the mobile communications device;

create, database system, a query definition corresponding to the set of user inputs for searching the relational data in accordance with the set of user inputs; and store, database system, the created query definition.

16. The system of claim 15, further comprising instructions to:

apply, by the, the created query definition and metadata API to retrieve the corresponding relational data;

provide, database system, information to the mobile communications device, in response to receiving a selection of the query definition data from the mobile communications device, to cause to generate a second view of the relational data by the mobile communications device based on the query definition.

17. The system of claim 16, wherein the instructions to provide information to the mobile communications device to cause to generate a second view of the relational data by the mobile communications device based on the query definition comprises instructions to provide information to the mobile communications device to cause to generate a second view of the relational data by the mobile communications device by filtering the relational data based on the received set of user inputs.

18. The system of claim 17, wherein the received set of user inputs comprises at least one of a selection an attribute, a selection of an operator, and an entry of a value.

19. The system of claim 18, wherein the selection of the attribute and the selection of the operator are received as a selection from a pick list.

20. The system of claim 19, wherein the entry of the value is received as an entry into a textbox.

* * * * *